US009759411B2

(12) United States Patent
Kim

(10) Patent No.: US 9,759,411 B2
(45) Date of Patent: Sep. 12, 2017

(54) LED LAMP HAVING ADJUSTABLE ILLUMINATION ANGLE

(71) Applicant: Jong-Chen Kim, Bucheon-si (KR)

(72) Inventor: Jong-Chen Kim, Bucheon-si (KR)

( * ) Notice: Subject to any disclaimer, the term of this patent is extended or adjusted under 35 U.S.C. 154(b) by 270 days.

(21) Appl. No.: 13/765,746

(22) Filed: Feb. 13, 2013

(65) Prior Publication Data

US 2014/0204595 A1      Jul. 24, 2014

(30) Foreign Application Priority Data

Jan. 22, 2013   (KR) .......................... 10-2013-0006886

(51) Int. Cl.
*F21V 21/00* (2006.01)
*F21V 21/14* (2006.01)
(Continued)

(52) U.S. Cl.
CPC .......... *F21V 21/14* (2013.01); *F16C 11/0661* (2013.01); *F16M 11/06* (2013.01);
(Continued)

(58) Field of Classification Search
CPC .. F21V 2114/28; F21V 2114/30; F21V 21/14; F21V 21/28; F21V 21/30; F21V 21/26; F21V 21/34; F21V 21/29; F21L 4/04; F16B 37/045; F16B 37/0821; F16M 11/06; F16M 11/10; F16M 11/08; F16M 11/043; F16C 11/103; F16C 11/0661; Y10T 403/32073; Y10T 403/32278; Y10T 403/32622; Y10T 403/32877; Y10T 403/32885; Y10T 403/32254; Y10T 403/32262; Y10T 403/32286; Y10T 403/32418; Y10T 403/32426; Y10T 403/32442; Y10T 403/32451; Y10T 403/32459; Y10T 403/32163; Y10T 403/32172
(Continued)

(56) References Cited

U.S. PATENT DOCUMENTS 2,714,536 A  *  8/1955  Wirth ...................... F16C 32/02
                                                                        177/264
3,423,089 A  *  1/1969  Andis ........................... 473/245
(Continued)

*Primary Examiner* — Byron T Gyllstrom
*Assistant Examiner* — James Endo
(74) *Attorney, Agent, or Firm* — IPLA P.A.; James E. Bame

(57) ABSTRACT

An LED lamp includes: a lamp housing configured to have LEDs for emitting light embedded therein, have the front thereof opened so that the light of the LEDs is radiated, have an angle adjustment groove formed laterally and lengthily, and having outside concave-convex parts formed in a convex and arc shape on both sides of the angle adjustment groove; a guide block inserted into the angle adjustment groove of the lamp housing and fixed movably along the angle adjustment groove; a fixing block configured to have an inside concavo-convex part formed in a concave and arc shape under one side of the fixing block so that the inside concavo-convex part corresponds to the outside concave-convex parts of the lamp housing; a first fastening member configured to penetrate the inside concavo-convex part of the fixing block and fastened to the guide block inserted into the angle adjustment groove.

6 Claims, 12 Drawing Sheets

(51) Int. Cl.
*F16M 11/06* (2006.01)
*F16C 11/06* (2006.01)
*F21V 21/26* (2006.01)
*F16M 11/10* (2006.01)
*F21V 21/34* (2006.01)
*F21V 21/30* (2006.01)

(52) U.S. Cl.
CPC .............. *F16M 11/10* (2013.01); *F21V 21/26* (2013.01); *F21V 21/30* (2013.01); *F21V 21/34* (2013.01); *Y10T 403/32073* (2015.01); *Y10T 403/32622* (2015.01)

(58) Field of Classification Search
USPC ....... 362/269, 270, 275, 285, 287, 419, 427, 362/249.11, 217.12, 217.16, 368; 248/298.1, 299.1, 292.14, 292.12, 245, 248/324, 323, 480, 416, 479, 481, 482, 248/484, 485, 486, 487, 415, 418, 420, 248/291.1, 214, 230.1, 425, 500, 510; 403/61, 91, 121
See application file for complete search history.

(56) References Cited

U.S. PATENT DOCUMENTS

| | | | | |
|---|---|---|---|---|
| 4,155,590 | A | * | 5/1979 | Cunningham ............ 297/215.15 |
| 4,568,121 | A | * | 2/1986 | Kashima ................... 297/215.15 |
| 5,244,301 | A | * | 9/1993 | Kurke et al. .................. 403/390 |
| 5,722,718 | A | * | 3/1998 | Still et al. ................. 297/215.15 |
| 5,979,978 | A | * | 11/1999 | Olsen et al. .............. 297/215.15 |
| 6,073,898 | A | * | 6/2000 | Dua ...................... B60Q 1/0483 |
| | | | | 248/291.1 |
| 6,710,325 | B2 | * | 3/2004 | Kuhar .......................... 250/221 |
| 7,281,695 | B2 | * | 10/2007 | Jordan ................... F16B 2/065 |
| | | | | 248/231.41 |
| 2003/0106992 | A1 | * | 6/2003 | Koyama et al. ............... 250/221 |
| 2004/0017681 | A1 | * | 1/2004 | Lee ............................... 362/133 |
| 2005/0151040 | A1 | * | 7/2005 | Hsu .............................. 248/214 |
| 2005/0173363 | A1 | * | 8/2005 | Herb ........................ F16L 3/16 |
| | | | | 212/83 |
| 2006/0027725 | A1 | * | 2/2006 | Lin ............................... 248/534 |
| 2007/0258252 | A1 | * | 11/2007 | Matts et al. .................. 362/418 |
| 2011/0128737 | A1 | | 6/2011 | Kim |
| 2011/0194287 | A1 | * | 8/2011 | Georgitsis et al. ........... 362/277 |
| 2011/0317435 | A1 | * | 12/2011 | Wang ............................ 362/370 |
| 2012/0163005 | A1 | * | 6/2012 | Liu ............................... 362/427 |

\* cited by examiner

LED LAMP HAVING ADJUSTABLE ILLUMINATION ANGLE

CROSS REFERENCES

This application claims the benefit of Korean Patent Application No. 10-2013-0006886, filed 22 Jan. 2013, which is hereby incorporated by reference in its entirety into this application.

BACKGROUND OF THE INVENTION

1. Field of the Invention

The present invention relates to a Light-Emitting Diode (LED) apparatus having an adjustable illumination angle, wherein the LED lamp can be fixed to a structure by adjusting the radiation directions of lamps in all directions and a lamp housing can be switched at various angles and fixed so that light radiated from lamps are radiated in various directions.

2. Description of the Related Art

In general, an LED lighting apparatus is used to emit light using LEDs and is for indoor use and outdoor use.

The present invention is related to Korean Patent Registration No. 20-0448175 entitled "EASY ANGLE-ADJUSTING LED LIGHTING APPARATUS" issued to the applicant of the present invention.

The conventional patent includes an angle adjustment member and a fastening fixing member fastened by an external fastening member that penetrates the angle adjustment member in the external fixing member at which the lighting apparatus will be installed and inserted into a fastening groove. In the angle adjustment member, a part of the outer circumference of a casing is formed to have an arc shape, a concavo-convex part is formed in the outer circumference of the casing formed in an arc shape, a fastening groove is formed within the concavo-convex part and configured to penetrate the casing in the length direction of the casing, and a concave-convex surface engaged with the concavo-convex part is formed on one side of the angle adjustment member. Accordingly, the conventional LED lighting apparatus can slightly adjust the angle of the casing up and down and left and right in the state in which the conventional LED lighting apparatus, together with the angle adjustment member, is fixed to the external fixing member through the fastening member.

The conventional LED lighting apparatus, however, is problematic in that if the casing is sought to be adjusted left and right, the angle of the casing adjusted up and down must be adjusted again because the fastened fastening member must be released.

Furthermore, the conventional LED lighting apparatus has a problem in that the casing cannot be adjusted at various angles.

SUMMARY OF THE INVENTION

Accordingly, the present invention has been made keeping in mind the above problems occurring in the prior art, and an object of the present invention is to provide an LED lamp having an adjustable illumination which can be fixed to a structure by adjusting the radiation directions of lamps in all directions.

Another object of the present invention is to provide an LED lamp having an adjustable illumination in which a lamp housing can be switched at various angles and fixed so that light radiated from lamps is radiated in various directions.

In accordance with an aspect of the present invention, a Light-Emitting Diode (LED) lamp having an adjustable illumination angle includes a lamp housing configured to have LEDs for emitting light embedded therein, have the front thereof opened so that the light of the LEDs is radiated, have an angle adjustment groove formed laterally and lengthily, and having outside concave-convex parts formed in a convex and arc shape on both sides of the angle adjustment groove; a guide block inserted into the angle adjustment groove of the lamp housing and fixed movably along the angle adjustment groove; a fixing block configured to have an inside concavo-convex part formed in a concave and arc shape under one side of the fixing block so that the inside concavo-convex part corresponds to the outside concave-convex parts of the lamp housing; a first fastening member configured to penetrate the inside concavo-convex part of the fixing block and fastened to the guide block inserted into the angle adjustment groove so that an angle of the lamp housing fixed to the fixing block is adjusted and the inside concavo-convex part is closely adhered and fixed to the outside concave-convex parts; and a second fastening member fixed to a structure on the other side of the fixing block in a state in which the second fastening member is spaced apart from the first fastening member.

Preferably, the second fastening member fixes the fixing block to the structure on the other side of the fixing block in a direction identical with or different from the first fastening member.

Preferably, the angle adjustment groove is formed vertically, horizontally, or at a predetermined angle in the rear of the lamp housing.

Preferably, a latching jaw engaged with the bottom of the guide block is formed in the angle adjustment groove.

Preferably, the guide block includes a screw tap formed in a semi-cylindrical shape and formed on an outer circumference thereof, and the first fastening member is screwed to the screw tap.

Preferably, the fixing block includes a first through hole formed to penetrate the inside concavo-convex part and a second through hole spaced apart from the inside concavo-convex part and formed to penetrate the fixing block on the other side of the fixing block.

Preferably, the first through hole and the second through hole are vertically formed with the first and the second through holes being paced apart from each other or the first through hole is slantingly formed at a predetermined angle and the second through hole is vertically formed.

Preferably, the fixing block includes a rotation prevention groove formed under the second through hole in order to prevent the head of the second fastening member that penetrates the second through hole from rotating.

Preferably, the rotation prevention groove is formed to be wider than both sides of the hexagonal head a hexagonal nut of the second fastening member or and to have a smaller width than an interval between symmetrical edges of the hexagonal head or hexagonal nut of the second fastening member.

Preferably, the second fastening member includes a bolt formed to penetrate the structure and the hexagonal nut screwed to the bolt.

Preferably, the LED lamp further includes a friction prevention member for preventing damage to the fixing block, fixed to the structure by the second fastening member, due to friction, wherein the fixing block includes an insertion groove configured to have the friction prevention member inserted therein in a state in which the friction prevention member protrudes into the fixing block and formed over the second through hole.

DETAILED DESCRIPTION OF THE INVENTION

An LED lamp having a variety of adjustable angles according to an exemplary embodiment of the present invention is described in detail with reference to the accompanying drawings.

Figure 1:
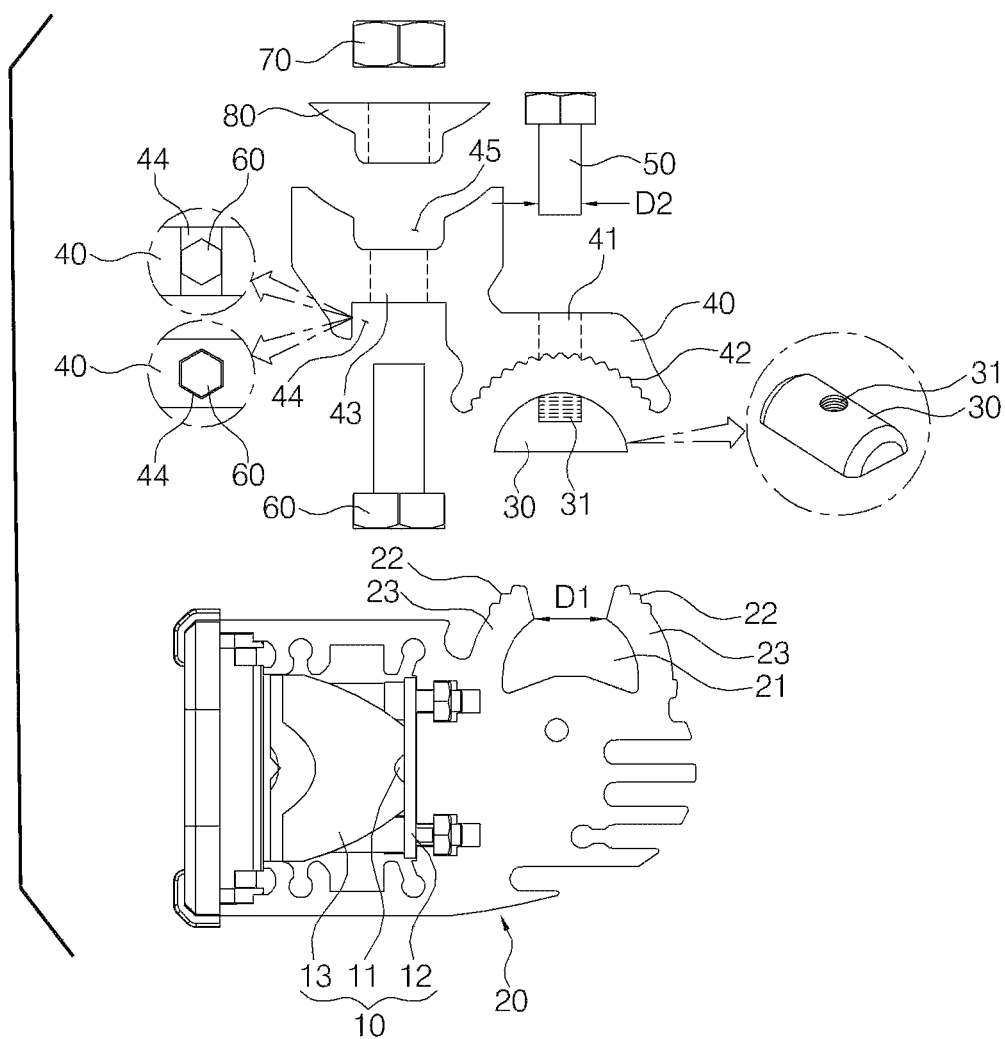
FIG. 1 is an exploded diagram of an LED lamp having a variety of adjustable angles in accordance with one embodiment of the present invention.
Figure 2:
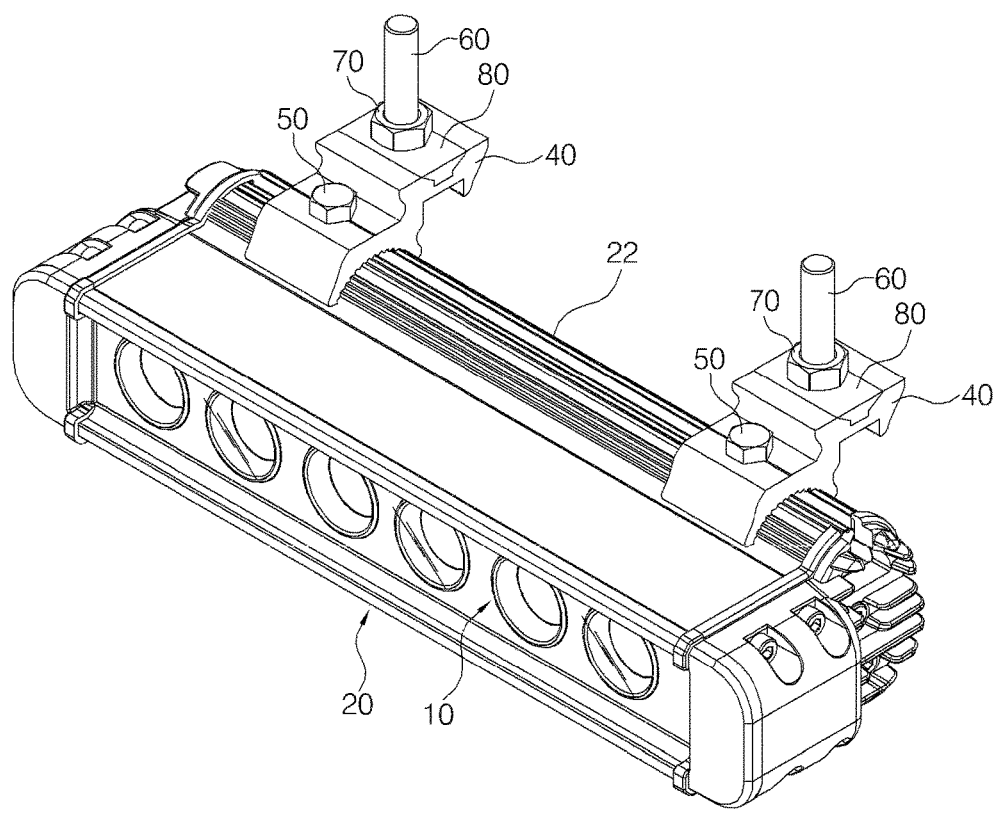
FIG. 2 is a perspective view showing that the LED lamp of the present invention is assembled.
Figure 3:
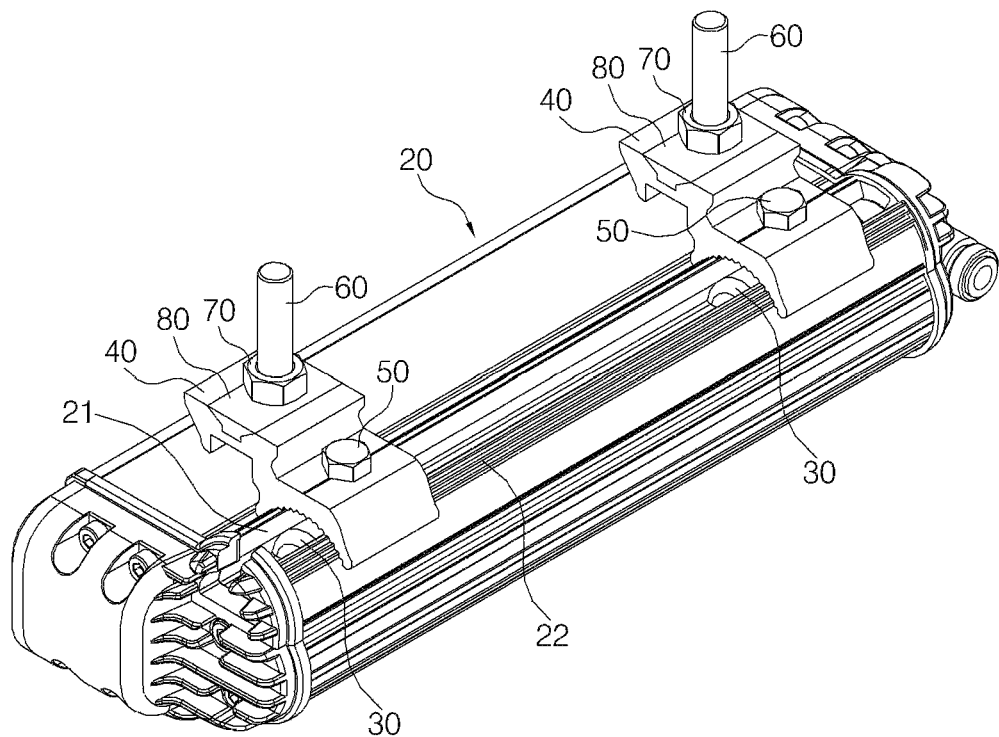
FIG. 3 is a perspective view showing the rear of a lamp housing to which the LED lamp of the present invention is applied.

As shown in FIGS. 1 to 3, the LED lamp of the present invention include a lamp housing 20, a guide block 30, a fixing block 40, a first fastening member 50, and a second fastening member 60.

The lamp housing 20 is configured to have LEDs 10 for emitting light embedded therein, have the front opened so that light from the LEDs 10 is radiated. The lamp housing 20 includes an angle adjustment groove 21 lengthily formed on both sides in the rear in a convex and arc shape and outside concave-convex parts 22 formed on the outer surface of the angle adjustment groove 21. The LEDs 10 are installed in a circuit board 12 embedded in the lamp housing 20, and a reflector 13 for reflecting the light of the LEDs 10 is installed in the circuit board 12.

The angle adjustment groove 21 is lengthily formed in both direction of the lamp housing 20, and the guide block 30 can be laterally inserted into the angle adjustment groove 21. Accordingly, the angle adjustment groove 21 supports the outer circumferential surface of the guide block 30 inserted therein so that the guide block 30 moves in both directions of the lamp housing 20. As described above, the guide block 30 can be laterally inserted into or separated from the lamp housing 20 conveniently in the state in which the lamp housing 20 has not been exploded. As shown in FIGS. 1 and 5A-5D, the bottom portion of the angle adjustment groove 21 has a concave cross-section, and the guide block 30 has a substantially flat bottom surface.

Furthermore, the angle adjustment groove 21 includes incision parts 23 formed to face each other in a central part on the upper side of the angle adjustment groove 21 and spaced apart from each other at a predetermined interval. Here, the incision parts 23 guide a bolt, that is, the first fastening member 50 screwed onto the guide block 30, so that the first fastening member 50 moves in both directions in the state in which they are inserted into the first fastening member 50.

Furthermore, it is preferred that an interval D1 between the ends of the incision parts 23 that face each other be greater than the diameter D2 of the first fastening member 50. Accordingly, in the state in which the first fastening member 50 has not been fully fastened to a screw tap 31 through the first through hole 41 of the fixing block 40, an angle of the lamp housing 20 can be slightly adjusted around the first fastening member 50 with the outside concave-convex parts 22 and the inside concave-convex part 42 being spaced apart from each other. If the first fastening member 50 is fastened so that the outside concave-convex parts 22 come into contact with the inside concave-convex part 42 again, the outside concave-convex parts 22 are engaged with the inside concave-convex part 42 and thus brought in contact with each other. As a result, the lamp housing 20 can be firmly fixed to the fixing block 40 in the state in which an angle of the lamp housing 20 has been adjusted. That is, an angle of the lamp housing 20 can be adjusted up and down.

Furthermore, the angle adjustment groove 21 can be formed to be open upwardly at the top in the rear of the lamp housing 20. Accordingly, when the guide block 30 is engaged with the angle adjustment groove 21 that is directed upwardly, the lamp housing 20 is horizontally fixed to the first fastening member 50 that is in a vertical state.

Figure 4:
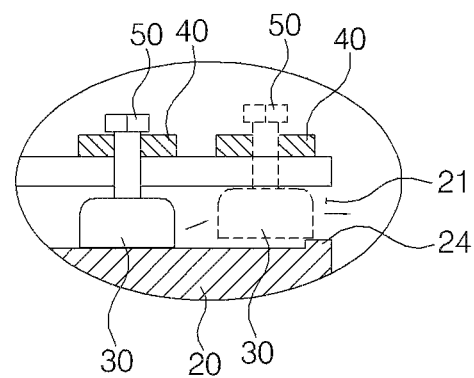
FIG. 4 is a cross-sectional view showing major parts of the LED lamp of the present invention.

Meanwhile, as shown in FIG. 4, the latching jaw 24 of the angle adjustment groove 21 that is engaged with the bottom of the guide block 30 is formed at the end of the angle adjustment groove 21. Accordingly, the guide block 30 is not easily separated from the angle adjustment groove 21 because the bottom of the guide block 30 is engaged with the latching jaw 24 in a process of moving the guide block 30 in the angle adjustment groove 21. Furthermore, in order to fully separate the guide block 30 from the angle adjustment groove 21, when the first fastening member 50 fastened to the guide block 30 in the state in which it has not been fully fastened to the guide block 30 is grasped and the guide block 30 is raised up so that the latching jaw 24 is separated from the guide block 30, the guide block 30 can be easily separated from the angle adjustment groove 21.

As shown in FIG. 1, the guide block 30 is formed in a semi-cylindrical shape. Accordingly, the guide block 30 can be supported generally uniformly by the inner circumferential surface of the angle adjustment groove 21, that is, a semi-circular shape. Here, the guide block 30 can be formed to have a diameter which is smaller than the inner diameter of the angle adjustment groove 21, but is greater than the interval D1 between the incision parts 23. That is, the guide block 30 can move along the angle adjustment groove 21 without being deviated externally through the incision parts 23. Furthermore, the screw tap 31 to which the first fastening member 50 to be described is screwed is formed in the outer circumferential surface of the guide block 30.

The fixing block 40 includes an inside concavo-convex part 42 having a concave and arc shape at the bottom of one side of the fixing block 40 so that the inside concavo-convex part 42 corresponds to the outside concave-convex parts 22 of the lamp housing 20. The inside concavo-convex part 42 has the arc shape having the same diameter as the outside concave-convex parts 22. Accordingly, the inside concavo-convex part 42 can precisely come in contact with the outside concave-convex parts 22.

Furthermore, the first through hole 41 of the fixing block 40 is vertically formed on one side of the fixing block 40 so that the inside concave-convex part 42 is penetrated. A second through hole 43 is spaced apart from the inside concave-convex part 42 and is vertically formed on the other side of the fixing block 40 so that the inside concave-convex part 42 is penetrated. Accordingly, the first fastening member 50 (e.g., a bolt) slantingly penetrates the first through hole 41 at an angle of about 45 degrees, and the second fastening member 60 (e.g., a bolt) vertically penetrates the second through hole 43.

The fixing block 40 further includes a rotation prevention groove 44 formed under the second through hole 43 and configured to prevent the rotation of the head of the second fastening member 60 that penetrates the second through hole 43. The rotation prevention groove 44 is formed to be wider than the hexagonal head of a second fastening member 60 or a hexagonal nut 70 and also formed to have a width smaller than an interval between the symmetrical edges of the hexagonal head of the second fastening member 60 or the hexagonal nut 70.

Accordingly, the rotation prevention groove 44 is fixed so that it prevents the rotation of the head of the second fastening member 60 that penetrates the second through hole 43. Thus, the fixing block 40 can be fixed to a structure 1 by fastening only the hexagonal nut 70 to the second fastening member 60 that penetrates the structure 1. That is, the hexagonal nut 70 can be screwed to the second fastening member 60 by fastening only the hexagonal nut 70 without using an additional tool in order to fix the second fastening member 60.

In some embodiments, the inner circumferential surface of the rotation prevention groove 44 may be formed in a hexagonal form. That is, the second fastening member 60 can be fixed in the state in which it has been prevented from being rotated because all the six faces of the head of the second fastening member 60 (e.g., a bolt) or the hexagonal nut 70 are received in the inner circumferential surface of the rotation prevention groove 44 and supported thereto.

Furthermore, the fixing block 40 further includes an insertion groove 45 formed over the second through hole 43 and configured to have a friction prevention member 80 inserted and fixed thereto in the state in which the friction prevention member 80 protrudes into the fixing block 40.

The first fastening member 50 is fastened to the guide block 30 inserted into the angle adjustment groove 21 in the state in which the first fastening member 50 has penetrated the inside concavo-convex part 42 of the fixing block 40 so that the first fastening member 50 adjusts an angle of the lamp housing 20 fixed to the fixing block 40 and the inside concavo-convex part 42 is closely adhered to the outside concave-convex parts 22. The first fastening member 50 includes a bolt that is screwed to the screw tap 31. That is, when the first fastening member 50 is coupled with the screw tap 31 in the state in which the first fastening member 50 has penetrated the first through hole 41 of the fixing block 40, the first fastening member 50 fixes the fixing block 40 to the lamp housing 20.

Accordingly, in the state in which the first fastening member 50 is not fully fastened to the guide block 30 and the lamp housing 20 is spaced apart from the fixing block 40, when the lamp housing 20 is rotated 180° around the first fastening member 50 and the first fastening member 50 is fully fastened to the guide block 30, the lamp housing 20 rotated 180° can be fixed to the fixing block 40.

As shown in FIG. 5 the second fastening member 60 is fastened to the structure 1 through the first through hole 41 formed on the other side of the fixing block 40 in the state in which the second fastening member 60 has been spaced apart from the first fastening member 50. The second fastening member 60 includes a bolt configured to penetrate the structure 1 and a hexagonal nut 70 screwed onto the bolt.

Accordingly, when the second fastening member 60 is fastened to the structure 1 by means of the hexagonal nut 70 in the state in which the second fastening member 60 has penetrated the second through hole 43 of the fixing block 40, the lamp housing 20 is fixed to the structure 1 so that the lamp housing 20 emits light in a horizontal direction. Here, the fixing block 40 rotated by fully fastening the second fastening member 60 to the structure 1 after the fixing block 40 is rotated 360° in a horizontal state in the state in which the second fastening member 60 has not been fully fastened to the structure 1 can be fixed to the structure 1.

Figure 5A:
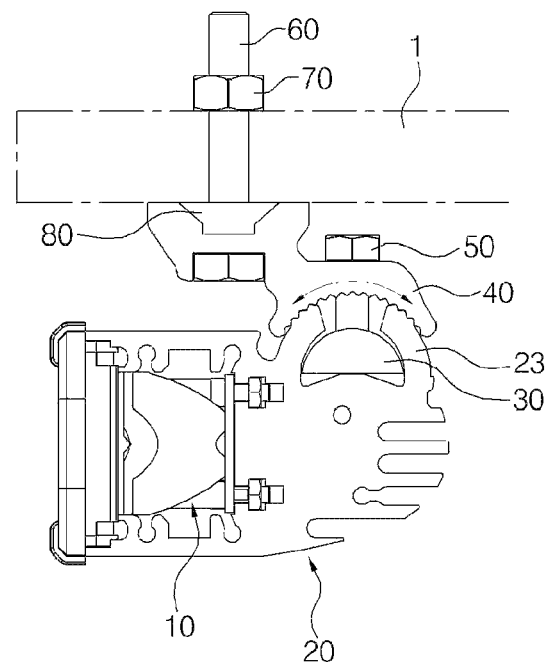
FIGS. 5A-5D are a diagram showing a state in which the LED lamp of the present invention fixed to a structure has been rotated left or right.
Figure 5B:
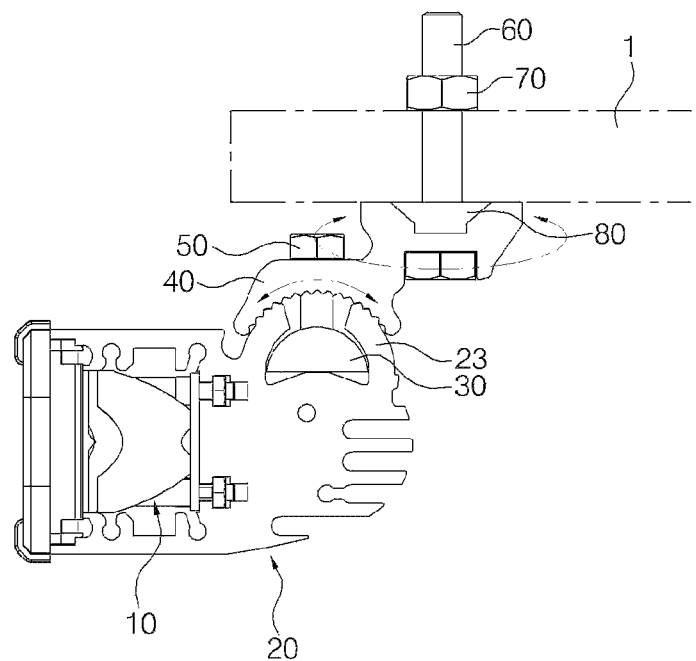

Here, the fixing block 40 can be fixed to the structure 1 by means of the second fastening member 60 so that the fixing block 40 is directed toward one side as shown of FIG. 5A and can be fixed to the structure 1 by means of the second fastening member 60 so that the fixing block 40 is directed toward the other side as shown in FIG. 5B. In the state in which the fixing block 40 is directed toward one side and the other side as described above, the lamp housing 20 can be fixed to the fixing block 40 so that the lamp housing 20 emits light toward one side.

Figure 5C:
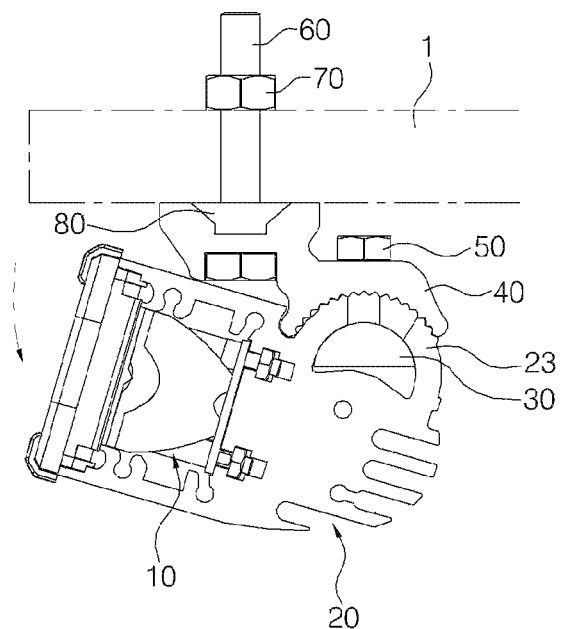
Figure 5D:
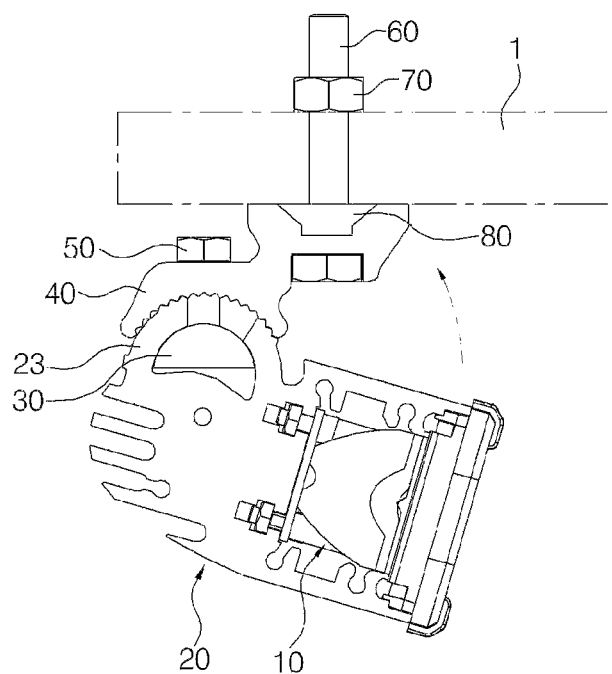

Furthermore, the fixing block 40 can be fixed to the fixing block 40 so that the lamp housing 20 emits light toward one side or the other side in the state in which the fixing block 40 has been fixed to the structure 1 in different directions as shown in FIGS. 5C and 5D. Furthermore, in the state in which the lamp housing 20 has been spaced apart from the fixing block 40 by slightly releasing the first fastening member 50 in the guide block 30, when the radiation direction of the lamp housing 20 is slightly adjusted up and down by rotating the lamp housing 20 up and down and the first fastening member 50 is then fastened to the guide block 30, the lamp housing 20 can be fixed to the fixing block 40.

As described above, in accordance with the present invention, since the lamp housing 20 can be adjusted in the left and right directions and in the up and down directions, separately, the left and right directions are not changed in a process of adjusting the up and down directions or the up and down directions are not changed in a process of adjusting the left and right directions.

Meanwhile, the LED lamp of the present invention further includes the friction prevention member 80 for preventing the fixing block 40, fixed to the structure 1 by way of the second fastening member 60, from being damaged by friction.

Accordingly, in the state in which the friction prevention member 80 has been inserted into the insertion groove 45 formed in the fixing block 40, when the second fastening member 60 is fixed to the structure 1 by way of the hexagonal nut 70 in the state in which the second fastening member 60 has penetrated the second through hole 43 through the friction prevention member 80, the friction prevention member 80 is placed between the structure 1 and the fixing block 40, with the result that friction between the structure 1 and the fixing block 40 is prevented and thus damage to the fixing block 40 is prevented.

An LED lamp having an adjustable illumination angle in accordance with another embodiment of the present invention is described in detail below with reference to the accompanying drawings.

Figure 6:
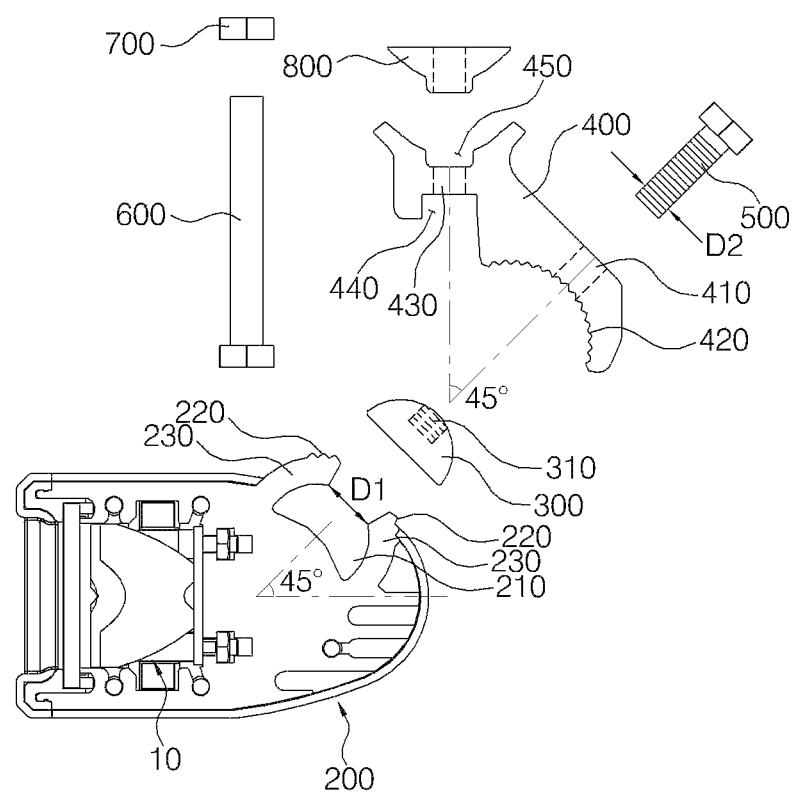
FIG. 6 is a diagram showing a state in which the LED lamp having an adjustable illumination angle in accordance with another embodiment of the present invention is exploded.
Figure 7:
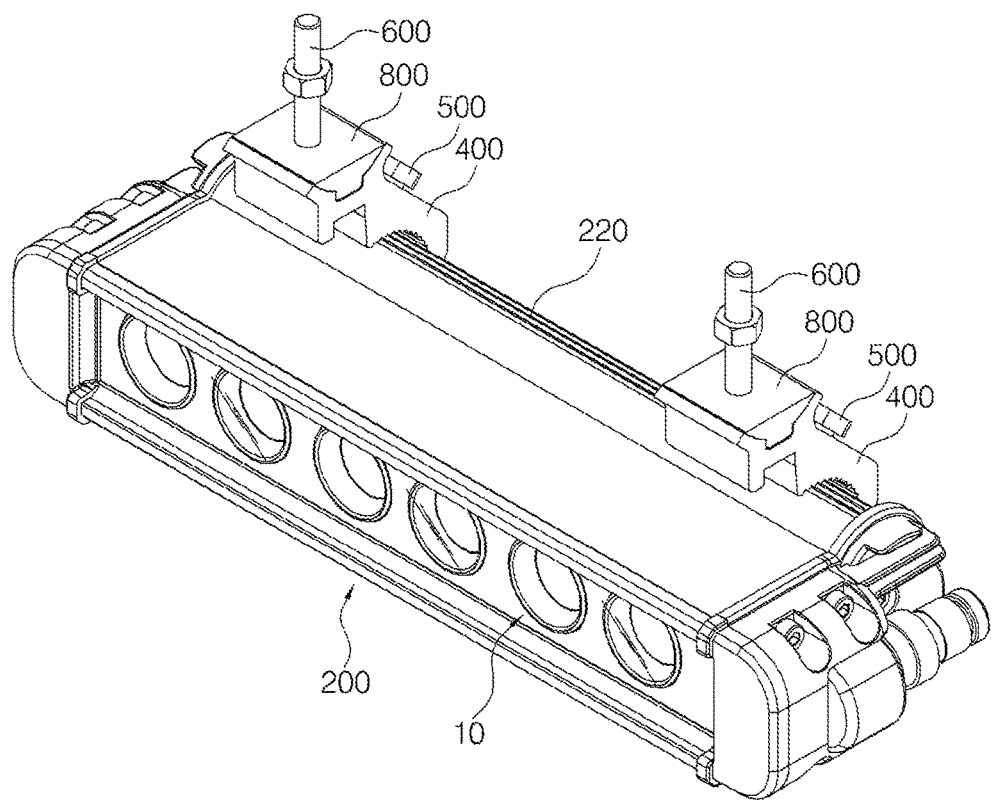
FIG. 7 is a perspective view showing a state in which the LED lamp of the present invention has been assembled.
Figure 8:
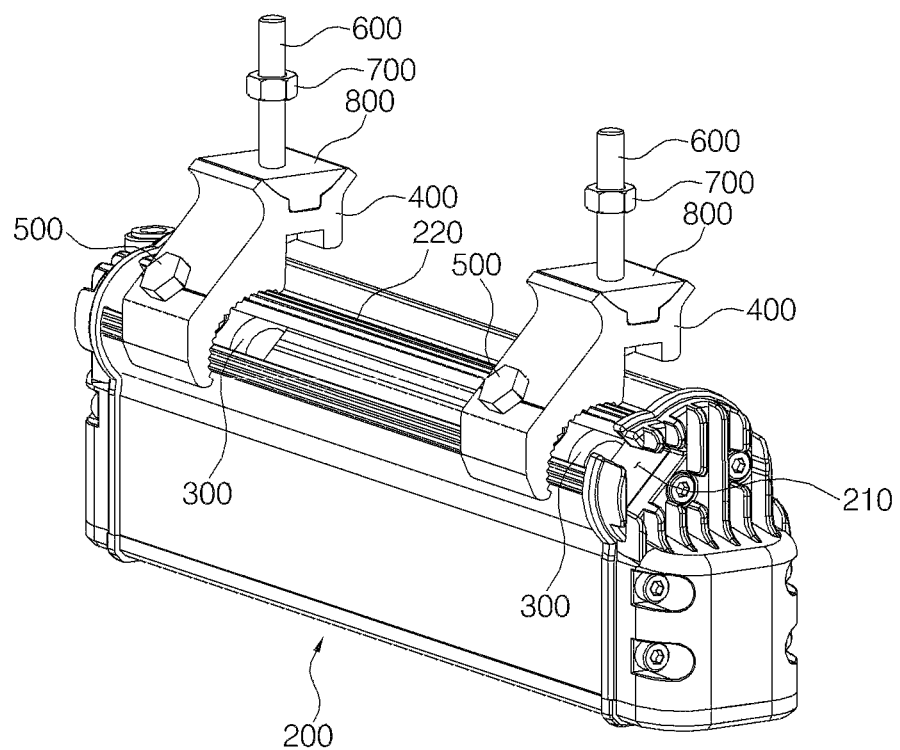
FIG. 8 is a perspective view showing the rear of a lamp housing in which the present invention is applied.

As shown in FIGS. 6 to 8, the LED lamp having an adjustable illumination angle in accordance with another embodiment of the present invention includes a lamp housing 200, a guide block 300, a fixing block 400, a first fastening member 500, and a second fastening member 600.

The lamp housing 200 has the same construction as that of the aforementioned embodiment, and thus a description of the construction is omitted.

As shown in FIG. 6, an angle adjustment groove 210, unlike in the aforementioned embodiment, is slantingly formed at a predetermined angle upwardly on the rear side of the lamp housing 200. It is preferred that the angle adjustment groove 210 be slantingly formed at a specific angle, for example, 45 degrees on the rear side of the lamp housing 200 in a horizontal state. Accordingly, when the guide block 300 is inserted into the angle adjustment groove 210 that is inclined at a predetermined angle, the lamp housing 200 is fixed in the inclined state of the predetermined angle.

The guide block 300 has the same construction as that of the aforementioned embodiment, and thus a description of the construction is omitted.

Unlike in the aforementioned embodiment, the fixing block 400 includes a first through hole 410 slantingly formed at a predetermined angle of about 45 degrees and configured to penetrate an inside concave-convex part 420 and a second through hole 430 spaced apart from the inside concave-convex part 420, vertically formed, and configured to penetrate the fixing block 400 on the other side. Accordingly, a bolt, that is, the first fastening member 500, penetrates the first through hole 410 at a tilt angle of about 45 degrees, and a bolt, that is, the second fastening member 600, penetrates the second through hole 430 in a vertical state.

Furthermore, the fixing block 400 includes an insertion groove 450 having the same construction as that of the aforementioned embodiment.

The first fastening member 500 has the same construction as that of the aforementioned embodiment, and thus a description of the construction is omitted.

As shown in FIG. 6, the second fastening member 600 is fixed to a structure 1 through the first through hole 410, formed on the other side of the fixing block 400, in a direction different from the first fastening member 500. That is, the second fastening member 600 fixes the fixing block 400 to the structure 1. Accordingly, the lamp housing 200 can be fixed to the structure 1 so that the lamp housing 200 radiates light in a horizontal or vertical direction.

The LED lamp having an adjustable illumination angle in accordance with another embodiment of the present invention can further include a friction prevention member 800 having the same construction as that of the aforementioned embodiment.

The operation and effects of the LED lamp of the present invention are described below.

First, in the state in which the guide block 300 has been inserted into the angle adjustment groove 210 and the fixing block 400 has been placed in the angle adjustment groove 210, the first fastening member 500 is screwed to the screw tap 310 while penetrating the first through hole 410.

Next, in the state in which the second fastening member 600 has been inserted into the second through hole 430 of the fixing block 400 and thus the head of the second fastening member 600 has been fixed to the rotation prevention groove 440, the friction prevention member 800 vertically penetrates the structure 1 in the state in which the friction prevention member 800 has been inserted into the second fastening member 600 and placed in the insertion groove 450 and the friction prevention member 800 is then fastened by the hexagonal nut 700.

Accordingly, as shown in FIGS. 9 and 10, when the second fastening member 600 fixes the fixing block 400 to the structure 1, the lamp housing 200 is fixed to the fixing block 400 in a horizontal state.

Figure 9A:
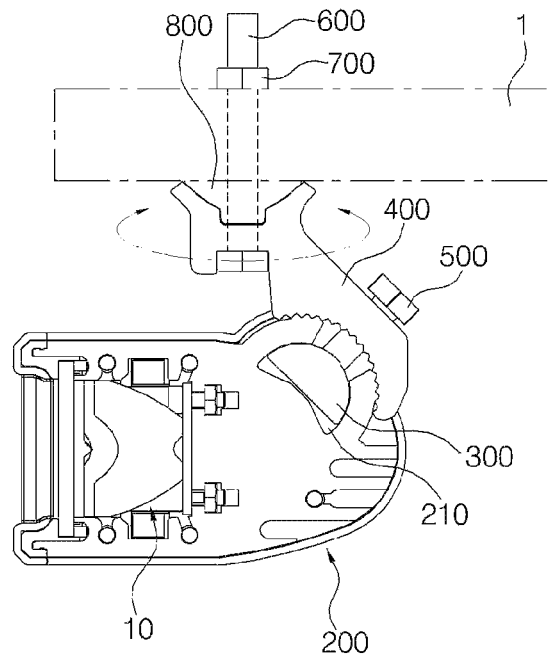
FIGS. 9A-9B are a diagram showing a state in which the LED lamp of the present invention has been rotated left and right in the state in which it has been fixed to a structure.
Figure 9B:
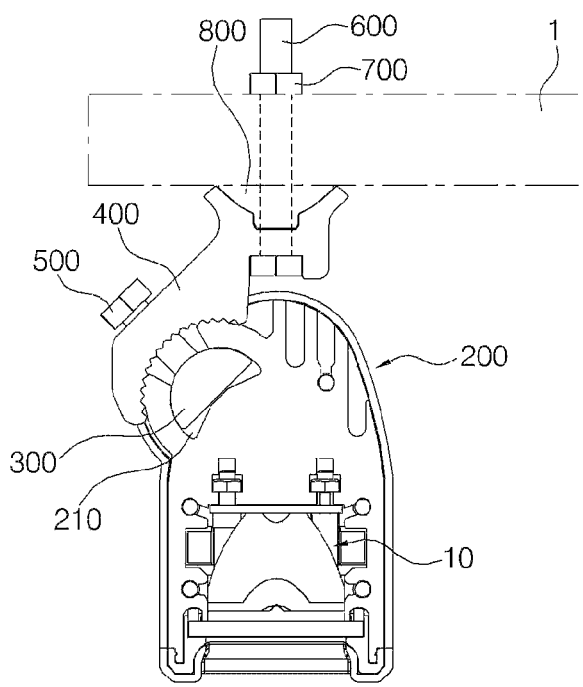

At this time, by slightly releasing the hexagonal nut 700 screwed to the second fastening member 600, the lamp housing 200 can be horizontally rotated in such a way as to be oriented toward one side as shown in FIG. 9A or the lamp housing 200 can be horizontally rotated in such a way as to be oriented toward the other side as shown in FIG. 9B. Next, when the fixing block 400 is fixed to the structure 1 by fully fastening the hexagonal nut 700 to the second fastening member 600, the lamp housing 200 can be fixed in the rotated state. As described above, the radiation direction of light can be manipulated left and right by rotating the lamp housing 200 left and right at an angle of 3600 degrees.

Figure 10A:
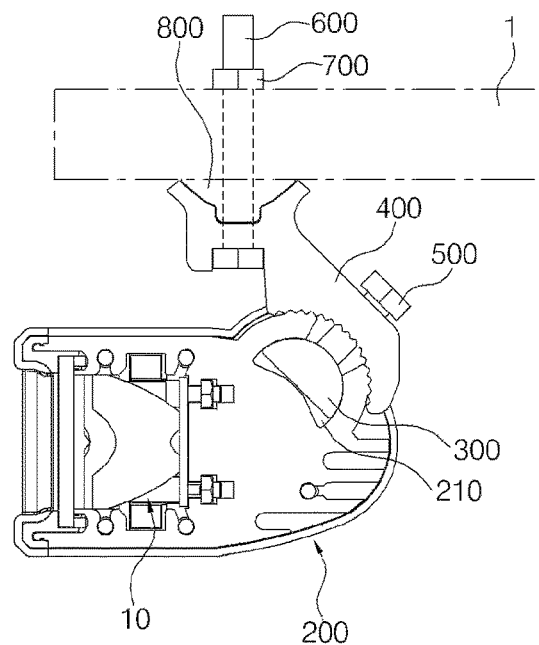
FIGS. 10A-10B are a diagram showing a state in which the LED lamp of the present invention has been rotated up and down in the state in which it has been fixed to a structure.
Figure 10B:
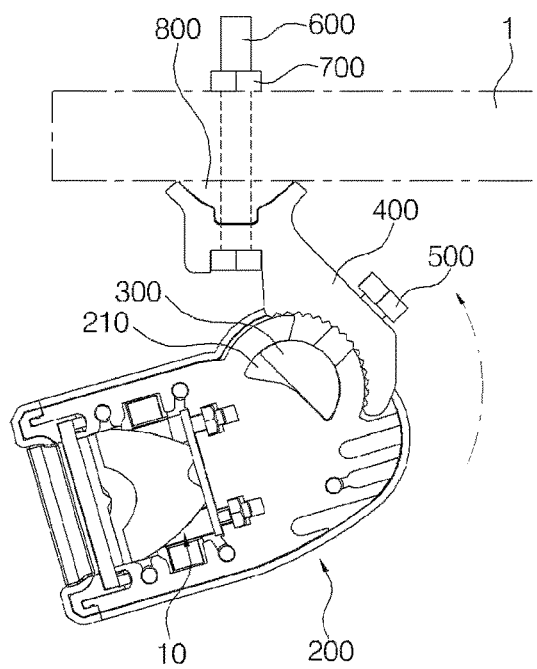

Furthermore, in the state in which the outside concave-convex parts 220 and the inside concavo-convex part 42 have been spaced apart from each other by slightly releasing the first fastening member 500 from the guide block 300 in the lamp housing 200 having a horizontal state as shown in FIG. 10A, an angle of the lamp housing 200 is adjusted up or down in the fixing block 400 as shown in FIG. 10B and the first fastening member 500 is fully fastened to the guide block 300. Accordingly, the lamp housing 200 can be fixed to the fixing block 400 in the state in which an angle of the lamp housing 200 has been adjusted up or down.

Figure 11A:
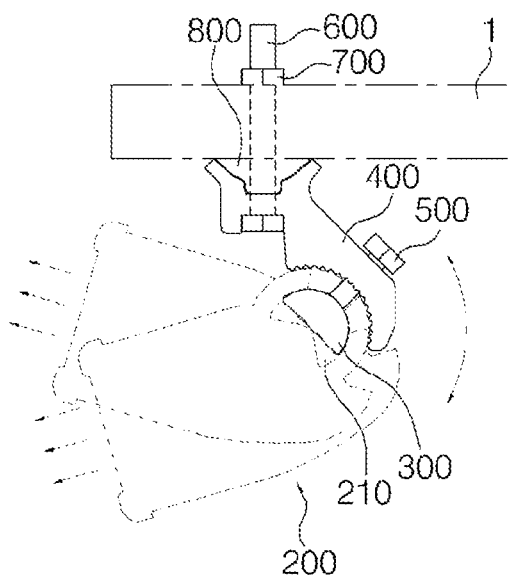
FIGS. 11A-11C are a diagram showing a state in which the LED lamp of the present invention has been switched at an angle of about 180 degrees and driven to radiate light in the state in which it has been fixed to a structure.
Figure 11B:
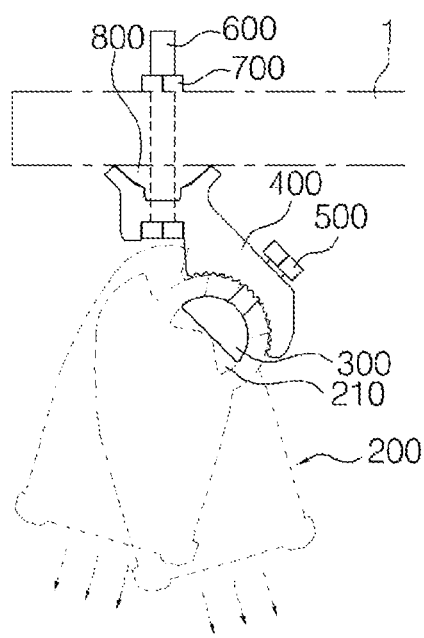
Figure 11C:
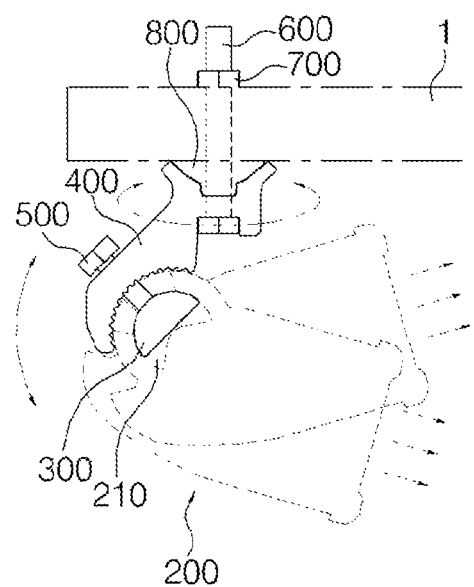

Furthermore, the lamp housing 200 can be adjusted at various angles, for example, a horizontal state in which an angle of the lamp housing 200 is oriented toward one side as shown in FIG. 11A, a vertical state in which an angle of the lamp housing 200 is oriented downward as shown in FIG. 11B, and a horizontal state in which an angle of the lamp housing 200 is oriented toward the other side as shown in FIG. 11C. Here, a radiation angle of light can be adjusted by slightly rotating the lamp housing 200 at a predetermined angle at once in the state in which an angle of the lamp housing 200 has been switched to the horizontal state or the vertical state. Accordingly, a radiation angle of light can be adjusted in various manners, for example, about 1800 degrees.

Here, as shown in FIG. 11B, when the first fastening member 500 is coupled to the guide block 300 again by separating the first fastening member 500 from the guide block 300 and then turning the lamp housing 200 inside out, the lamp housing 200 having the horizontal state can be rotated in the vertical state and fixed. That is, the lamp housing 200 can emit light horizontally in the horizontal state, and then the lamp housing 200 can switch to the vertical state and emit light downward.

As described above, the LED lamp of the present invention can be widely used in lighting apparatuses because a radiation angle of the light of the LED lamp can be adjusted at various angles.

Furthermore, the LED lamp of the present invention can adjust the radiation direction of light from LEDs widely because the lamp housing can be switched at various angles and fixed so that light emitted from the LEDs is radiated in various directions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Light-Emitting Diode (LED) lamp having an adjustable illumination angle, comprising:

a lamp housing configured to have LEDs for emitting light embedded therein, have a front thereof opened so that the light of the LEDs is radiated, have an angle adjustment groove formed laterally and lengthily, with a cross-section having a top portion in a partially circular shape cut through two edge points on a circle with respect to the center of the circle and a bottom portion with a central portion raised upwards from a straight line connecting the two edge points of the circle, and having outside concave-convex parts formed in a convex and arc shape on both sides of the angle adjustment groove, wherein bottom floor portion of the angle adjustment groove comprises a horizontal planar portion and two upward planar portions, each of which connecting a side of the horizontal planar portion and one of the two edge points;

a guide block formed in a semi-cylindrical shape, comprising a screw tap formed in a semi-cylindrical shape on an outer circumference thereof and inserted into the angle adjustment groove of the lamp housing and fixed movably along the angle adjustment groove, wherein the guide block has a substantially flat bottom surface, wherein a portion of the flat bottom surface of the guide block is guided by the bottom floor portion of the angle adjustment groove;

a fixing block configured to have an inside concavo-convex part formed in a concave and arc shape under one side of the fixing block so that the inside concave-convex part corresponds to the outside concave-convex parts of the lamp housing, having the other side spaced apart from the inside concavo-convex part and adhered to the structure and comprising a first through hole formed to penetrate the inside concavo-convex part, and a second through hole spaced apart from the inside concavo-convex part and formed to penetrate the fixing block on the other side of the fixing block adhered to the structure;

a first fastening member configured to penetrate the inside concave-convex part of the fixing block and fastened to the guide block inserted into the angle adjustment groove so that an angle of the lamp housing fixed to the fixing block is adjusted and the inside concave-convex part is closely adhered and fixed to the outside concave-convex parts; and a second fastening member fixed to a structure through the second through hole of the fixing block in a state in which the second fastening member is spaced apart from the first fastening member, wherein the second fastening member fixes the fixing block to the structure on the other side of the fixing block in a direction identical with or different from the first fastening member, wherein a latching jaw engaged with a bottom of the guide block is formed in the angel adjustment groove, wherein the angle adjustment groove and the guide block are configured to be adjusted in various angles for enabling a radiation angle of light from the lamp housing adjusted at least in three angles.

2. The LED lamp of claim 1, wherein:

the first through hole and the second through hole are vertically formed with the first and the second through holes being paced apart from each other, or the first through hole is slantingly formed at a predetermined angle and the second through hole is vertically formed.

3. The LED lamp of claim 1, wherein the fixing block comprises a rotation prevention groove formed under the second through hole in order to prevent a head of the second fastening member that penetrates the second through hole from rotating.

4. The LED lamp of claim 3, wherein the rotation prevention groove is formed to be wider than both sides of a hexagonal head or a hexagonal nut of the second fastening member and to have a smaller width than an interval between symmetrical edges of the hexagonal head or hexagonal nut of the second fastening member.

5. The LED lamp of claim 1, wherein the second fastening member comprises a bolt formed to penetrate the structure and the hexagonal nut screwed to the bolt.

6. The LED lamp of claim 1, further comprising a friction prevention member for preventing damage to the fixing block, fixed to the structure by the second fastening member, due to friction, wherein the fixing block comprises an insertion groove configured to have the friction prevention member inserted therein in a state in which the friction prevention member protrudes into the fixing block and formed over the second through hole.

* * * * *